(12) United States Patent
Erickson et al.

(10) Patent No.: US 6,556,762 B1
(45) Date of Patent: Apr. 29, 2003

(54) CABLE MANAGEMENT TIE BAR AND BRACKETS

(75) Inventors: Ricky Dean Erickson, Mantorville, MN (US); David George Lund, Byron, MN (US); Aleksander Miroslaw Mustwillo, Rochester, MN (US); Christopher Lee Tuma, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/021,878

(22) Filed: Dec. 13, 2001

(51) Int. Cl.[7] ................................................ G02B 6/00
(52) U.S. Cl. ...................... 385/134; 385/136; 248/49; 174/41
(58) Field of Search ................................ 385/134–137; 174/41, 70 A; 248/340, 60–65, 49

(56) References Cited

U.S. PATENT DOCUMENTS 4,538,782 A * 9/1985 Kirschenbaum ............ 248/68.1
5,921,402 A * 7/1999 Magenheimer ............... 211/26
6,240,234 B1 5/2001 Falkenberg et al. ......... 385/136

\* cited by examiner

*Primary Examiner*—Lynn D. Feild
*Assistant Examiner*—Son V. Nguyen
(74) *Attorney, Agent, or Firm*—Robert W. Lahtinen

(57) ABSTRACT

A cable management bar and bracket assembly is mounted within an equipment enclosure. The brackets are supported on and movable along the bar to present cable support positions at various transverse locations. The brackets are of generally U-shaped configuration with cable supporting hooks formed in one depending flange and with inwardly projecting tabs formed in the other depending flange which extend beneath the bar to make the bracket captive on the bar. Slots formed in the bar at one axial location permit the bracket to be assembled to and removed from the bar when the tabs are aligned with and passed through the slots. The assembly also includes mounting brackets at each end of the bar which are formed integral with the bar of a single piece of material while the bar portion is formed as a downwardly opening U-shaped channel element.

12 Claims, 3 Drawing Sheets

CABLE MANAGEMENT TIE BAR AND BRACKETS

FIELD OF THE INVENTION

This invention pertains to cable management and more particularly to a bar and bracket assembly to support and isolate cables within an enclosure.

BACKGROUND OF THE INVENTION

Modern electronic equipment commonly includes extensive cabling within the enclosure which must be managed rather than allowed to dangle from locations of connection such as the backplane of the device. To effect such cable management, hanger devices are incorporated within the enclosure which packages the equipment. This cable support function takes many forms, but a frequently used structure is a cable supporting bar traversing the cabinet interior which carries cable attaching members such as clips or ties. For flexibility, the attaching members are made to be moved along the bar to provide cable attachment capability at convenient locations. It is desirable that the number of support members be variable to accommodate a greater or lesser number of cables depending upon the number and mix of functions or features that are included in the device. Thus, it should be possible to change the number of cable carriers in an existing device. A further requirement is that not only should the cable attachment capability be variable, but the carriers supported on the bar should have the attribute that it is unlikely that a carrier may become accidentally disengaged from the supporting bar while capable of ready attachment to or disengagement from the bar during maintenance or equipment upgrade.

SUMMARY OF THE INVENTION

The cable management assembly of the present invention provides a bar that is supported within an electronic equipment enclosure and supports cable carrier brackets which are movable along the bar to provide convenient locations of cable support. With the bar attached to the using device enclosure, the cable carrier brackets may be assembled to the bar and disassembled from the bar to accommodate the use of greater or fewer numbers of cables should the device be modified to add or remove features.

The preferred embodiment of the invention which is shown and described, has the bar and mounting plates for securing the bar to the device enclosure formed from a single piece of material. The bar takes the form of a downwardly opening U-shaped channel. The cable supporting brackets are also U-shaped to partially surround the bar and present cable support elements integral with one downwardly extending flange portion. The other depending flange includes inwardly projecting tabs which underlie the adjoining flange portion of the bar on which the bracket is carried to prevent removal of the bracket from the bar. The bar further includes slots in the depending flange portion adjacent the bracket tabs. By aligning the bracket tabs with the slots in the bar, the brackets may be attached to or removed from the bar. To avoid inadvertent disconnection of the bracket from the bar, the slots are formed as irregularly extending channels to require that the bracket and the integral tabs be moved in multiple directions between the condition of attachment to the bar and disassociation from the bar.

DETAILED DESCRIPTION

Figure 1:
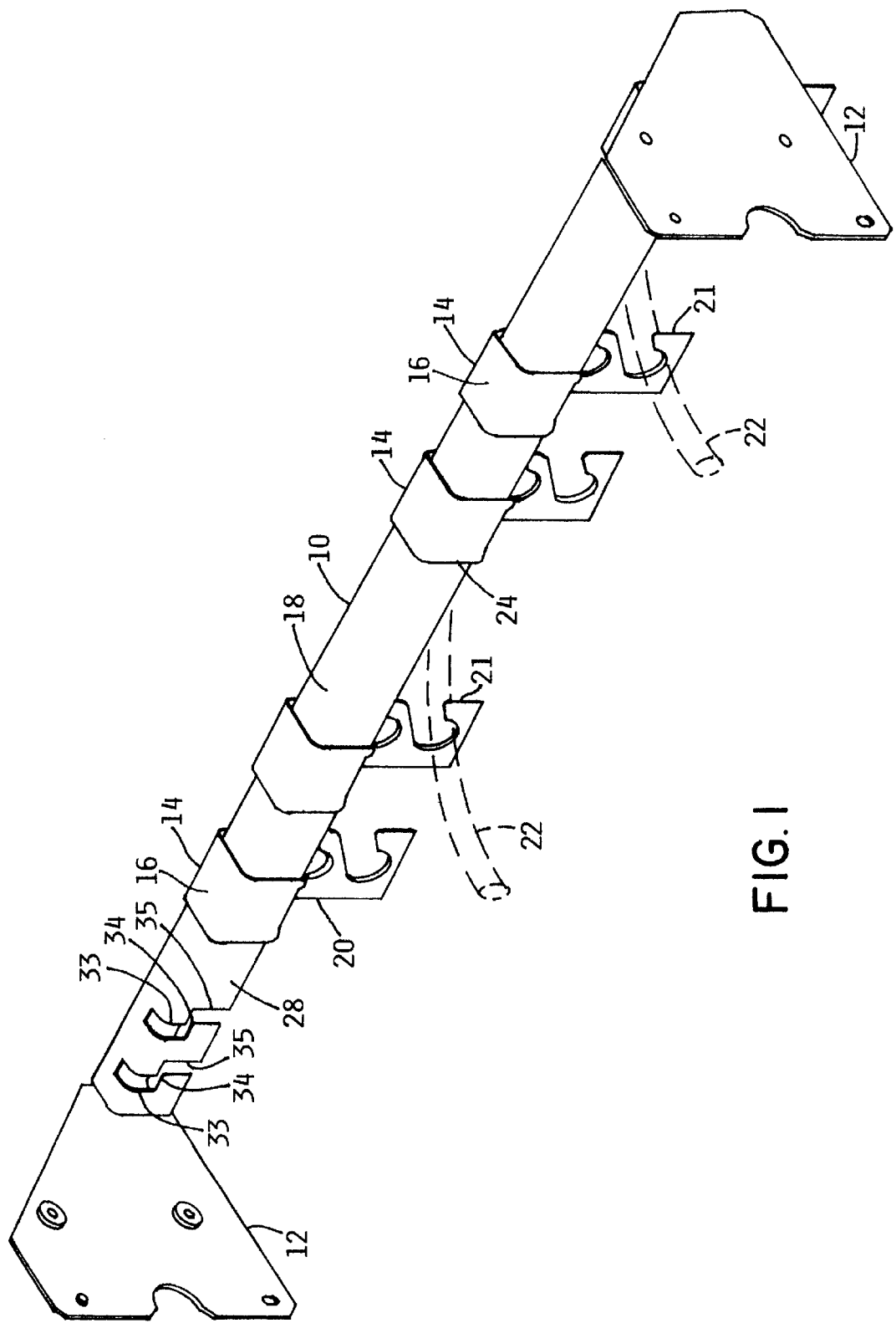
FIG. 1 is an isometric view of the cable management bar and cable carrying brackets of the present invention.

Referring to the drawings, FIG. 1 is an isometric view of the cable management bar and bracket assembly. The bar 10 is formed as a downwardly opening U-shaped channel with mounting plates 12, for securing the assembly to an electronic equipment enclosure frame, formed integrally with the bar. Bar 10 carries a series of brackets 14 which are also of generally U-shaped configuration and are axially movable along bar 10 to provide convenient locations of cable support transversely across the width of the equipment enclosure within which the bar is mounted.

The U-shaped brackets 14 include a bight portion 16 that bears against and is supported on the bight portion 18 of the bar and depending flanges at each side of the bar which guide the bracket along the bar. One flange 20 of each bracket 14 includes a pair of hook elements 21 formed therein which provide the cable support function as shown by the dotted line cable elements 22. The hook portions may support either a single cable or multiple cables as a function of the cable size or the dimensions of the cable supporting hook configuration. The other bracket flanges 24 include inwardly turned tabs 25 which underlie the adjoining bar flange 28 and hold the bracket 14 captive on the bar 10 irrespective of the orientation of the host equipment enclosure.

Although held captive on the bar, brackets 14 may be readily assembled to or disassembled from the bar 10. The bar 10 includes a pair of slots 31 which are separated by the same axial distance along the bar as the spacing between the tabs 25 on each of the brackets 14. Each of the slots 31 defines an irregular path during the length of passage through the bar flange 28. Thus to assemble a bracket 14 to the bar 10 the flanges must be positioned with the tabs 25 aligned with the upper openings of the slots 31, lowered through the upper portions 33 of the slots 31, moved axially along the intermediate bar slot portion 34 and finally lowered through the lower terminal slot portions 35 to bring the bracket to the fully assembled position. Similarly, to remove a bracket from the bar, the tabs 25 must be aligned with the slots 31 and subsequently moved upward through slot portion 35, axially along slot portion 34 and then upward through slot portion 33 to effect disengagement.

Figure 2:
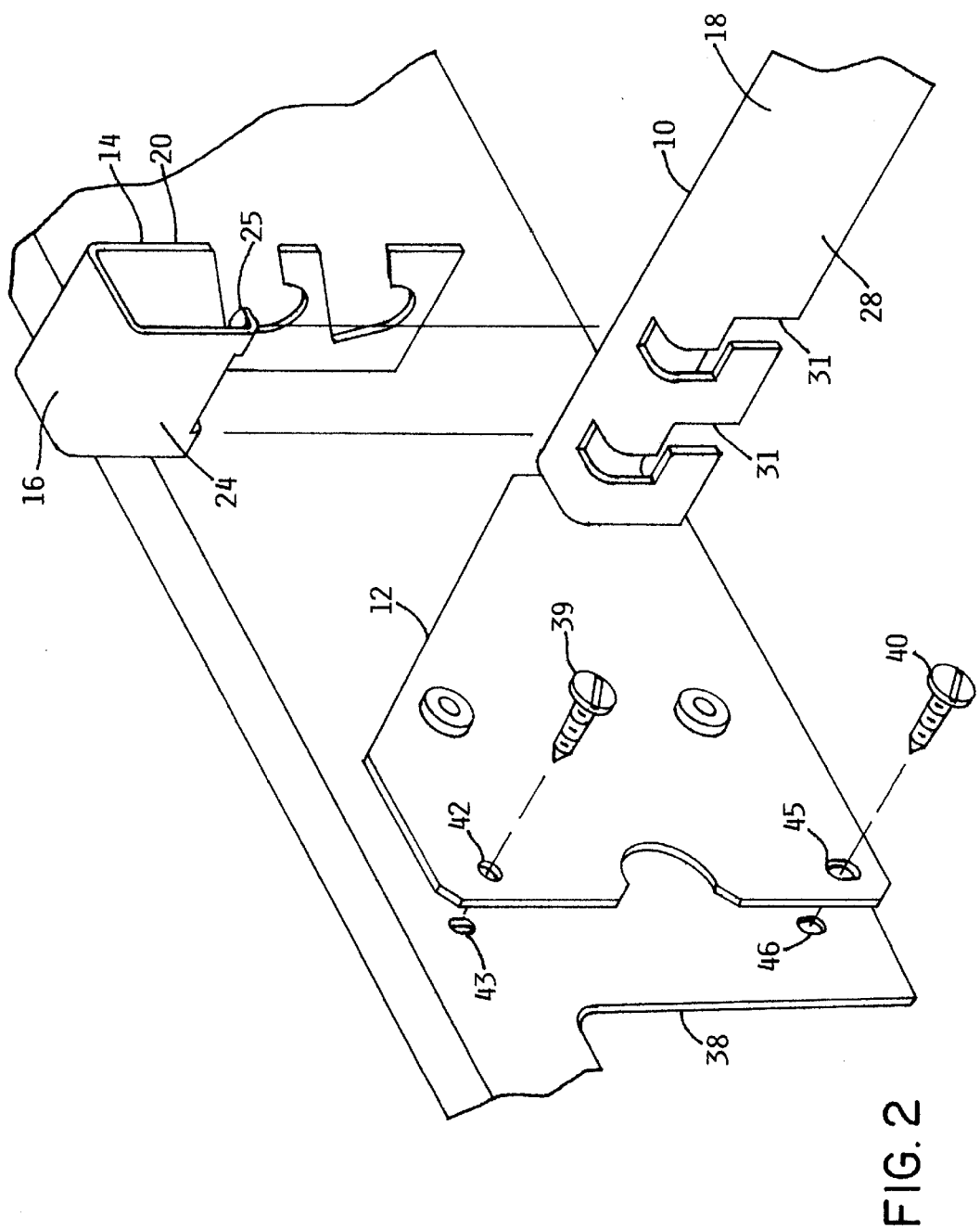
FIG. 2 is an exploded view of portions of the cable management bar assembly of FIG. 1 and the enclosure frame to which the cable management assembly is attached.

FIG. 2 is an exploded view showing the attachment of the bar and mounting plate assembly to the enclosure frame 38 by a pair of screws 39 and 40. Screw 39 extends through the circular mounting plate opening 42 and is received in the frame opening 43 while screw 40 extends through the elongated mounting plate opening 45 and is received in frame opening 46 to secure the bar assembly to frame 38. Bracket 14 includes the cable supporting hook portions 21 formed integral with one flange 20 and the inwardly turned tabs 25 which are an integral of the other bracket flange 28. The slots 31 which receive the bracket tabs start in the bight portion 18 of the bar 10 and extend downward through flange 28; have an intermediate transverse portion 34 and terminate in a downwardly extending portion 35 in flange 28 to terminate at the bottom edge of the flange.

Figure 3:
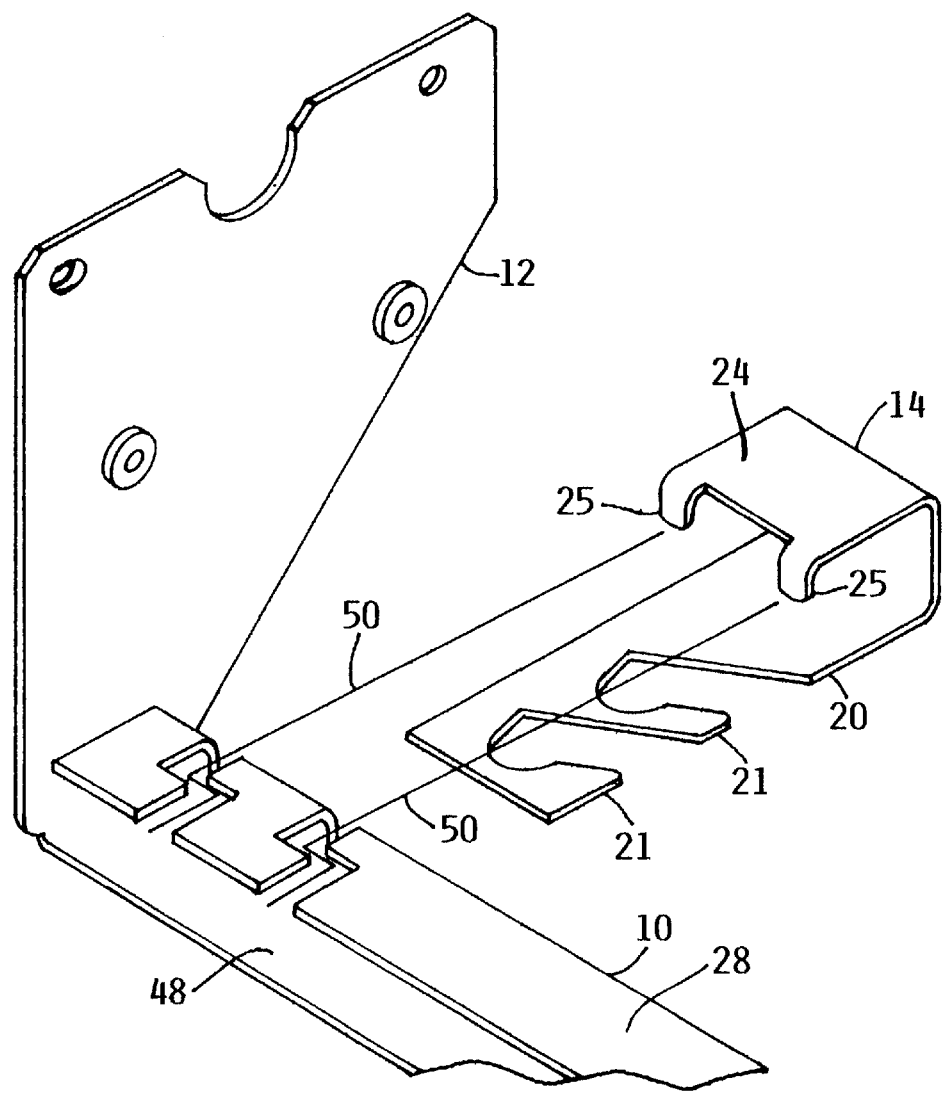
FIG. 3 is a view of a portion of the cable management assembly of FIG. 2 and an associated bracket with the assembly rotated 90 degrees to show the single piece construction of the bar and end mounting plates.

FIG. 3 shows the end portion of the bar and bracket assembly of FIG. 2 rotated 90 degrees. In this view the construction of bar 10 and mounting plate 12 from a single piece of material is illustrated wherein mounting plate 12 is a turned end portion contiguous with the bar flange 48. Bracket 14 is shown, positioned for assembly to bar 10, with lines 50 indicating the path followed by bracket tabs 25 during assembly or disassembly.

The foregoing description of an embodiment of the invention has been presented for purposes of illustration and description. It is not intended to be exhaustive or limit the invention to the precise form disclosed. Many modifications and variations are possible in light of the above teaching. It is intended that the scope of the invention be limited not by the description and illustrations, but rather by the claims appended hereto.

What is claimed is:

1. A cable management bar and bracket assembly comprising, a bar;

a bracket slidable along, partially surrounding and supported on said bar;

cable support means carried by said bracket;

means for limiting travel of said bracket along said bar beyond a length of bracket support;

tab means carried by said bracket which resists removal of said bracket from said bar; and slot means formed in said bar which permit removal of said bracket from said bar and assembly of said bracket to said bar when said tab means of said bracket is axially aligned with said slot means.

2. The cable management bar and bracket assembly of claim 1 wherein said slot means defines an irregular path requiring the bracket to be moved in multiple directions during assembly to or disassembly from said bar.

3. The cable management bar and bracket assembly of claim 2 wherein said bar comprises a downwardly opening generally U-shaped channel member.

4. The cable management bar and bracket assembly of claim 3 wherein said brackets are generally U-shaped members and said cable support means comprises a hook member formed in a flange portion of said bracket.

5. The cable management bar and bracket assembly of claim 4 wherein said tab means comprises an inwardly projecting tab formed as an integral portion of a flange portion of said bracket.

6. The cable management bar and bracket assembly of claim 5 wherein said means for limiting travel comprises mounting plate means at each axial end of said bar with said bar and said mounting plate means formed of a single piece of material.

7. The cable management bar and bracket assembly of claim 6 wherein said assembly comprises a plurality of brackets carried by said bar and each of said brackets includes plural hook shaped cable support portions disposed below said bar as said brackets are supported on said bar.

8. A cable management bar and bracket assembly within an equipment enclosure; comprising, a bar supported on and within said equipment enclosure;

a bracket movable axially along partially surrounding and supported on said bar;

cable support means carried by said bracket;

tab means forming a part of said bracket which normally preclude disengagement of said bracket from said bar; and slot means formed in said bar which permits said bracket to be removed from and assembled to said bar when said bracket tab means is axially aligned with said slot means and moved through said slot means.

9. The cable management bar and bracket assembly of claim 8 wherein said bracket comprises a generally U-shaped member with a cable supporting hook portion formed in one flange portion of the bracket and said tab means is formed as an integral part of the other flange portion of the bracket.

10. The cable management bar and bracket assembly of claim 9 wherein said bracket tab means comprises a pair of axially spaced tabs and said slot means comprises a pair of slots having the same axial spacing as said tab means, said pair of slots further including multiple changes of direction.

11. The cable management bar and bracket assembly of claim 10 wherein said bar is a downwardly opening generally U-shaped member and said assembly includes a pair of mounting plates formed integral with said bar.

12. The cable management bar and bracket assembly of claim 11 wherein said cable support means comprises a pair of hook portions formed as an integral part of said one bracket flange portion and positioned below said bar as said bracket is supported on said bar.

* * * * *